United States Patent
Zimmerman et al.

(10) Patent No.: US 8,177,121 B2
(45) Date of Patent: May 15, 2012

(54) AUTOMATED AGGREGATION AND COMPARISON OF BUSINESS SPENDING RELATIVE TO SIMILAR BUSINESSES

(75) Inventors: Jeffrey P. Zimmerman, Menlo Park, CA (US); Scott D. Cook, Woodside, CA (US)

(73) Assignee: Intuit Inc., Mountain View, CA (US)

( * ) Notice: Subject to any disclaimer, the term of this patent is extended or adjusted under 35 U.S.C. 154(b) by 1356 days.

(21) Appl. No.: 11/432,193

(22) Filed: May 10, 2006

(65) Prior Publication Data

US 2007/0168267 A1 Jul. 19, 2007

Related U.S. Application Data

(63) Continuation-in-part of application No. 11/331,507, filed on Jan. 13, 2006, now abandoned.

(51) Int. Cl.
G06F 17/00 (2006.01)
(52) U.S. Cl. .......................................... 235/375; 705/10
(58) Field of Classification Search ................... 235/375
See application file for complete search history.

(56) References Cited

U.S. PATENT DOCUMENTS

| | | |
|---|---|---|
| 4,393,394 A | 7/1983 | McCoy |
| 4,989,141 A | 1/1991 | Lyons et al. |
| 5,093,787 A | 3/1992 | Simmons |
| 5,208,906 A | 5/1993 | Morgan |
| 5,423,033 A | 6/1995 | Yuen |
| 5,433,483 A | 7/1995 | Yu |
| 5,495,565 A | 2/1996 | Millard et al. |
| 5,630,025 A | 5/1997 | Dolby et al. |
| 5,649,115 A | 7/1997 | Schrader et al. |
| 5,649,216 A | 7/1997 | Sieber |
| 5,701,400 A | 12/1997 | Amado |
| 5,737,440 A | 4/1998 | Kunkler |
| 5,805,911 A | 9/1998 | Miller ........................... 395/796 |
| 5,812,988 A | 9/1998 | Sandretto |
| 5,832,100 A | 11/1998 | Lawton et al. |
| 5,838,317 A | 11/1998 | Bolnick et al. |
| 5,842,185 A | 11/1998 | Chancey et al. |
| 5,845,300 A | 12/1998 | Comer et al. |
| 5,877,819 A | 3/1999 | Branson |
| 5,883,639 A | 3/1999 | Walton et al. |
| 5,896,321 A | 4/1999 | Miller et al. ............. 365/189.01 |
| 5,911,136 A | 6/1999 | Atkins |
| 5,918,216 A | 6/1999 | Miksovsky et al. ............. 705/35 |

(Continued)

OTHER PUBLICATIONS

Morochove, R., "First Look: Microsoft Office Small Business Accounting, Software Giant Tailors New Version of Office Suite for Small-Business Users," PC World, Nov. 5, 2004, 3 pages, [online] [Retrieved on Jan. 31, 2006] Retrieved from the Internet <URL:http://www.pcworld.com/news/article/0,aid,118495,00.asp>.

(Continued)

*Primary Examiner* — Thien M. Le
*Assistant Examiner* — Tae Kim
(74) *Attorney, Agent, or Firm* — McKay and Hodgson, LLP; Philip McKay; Sean P. Lewis

(57) ABSTRACT

A system and method compares aggregated spending transactions of a target entity with those of a collection of entities. The system and method aggregates spending transactions of the target entity, and compares with the corresponding aggregated spending transactions of the collection of entities.

18 Claims, 2 Drawing Sheets

U.S. PATENT DOCUMENTS

| | | | |
|---|---|---|---|
| 5,980,096 | A | 11/1999 | Thalhammer-Reyero |
| 6,009,459 | A | 12/1999 | Belfiore et al. |
| 6,029,195 | A | 2/2000 | Herz |
| 6,052,486 | A | 4/2000 | Knowlton et al. |
| 6,084,598 | A | 7/2000 | Chekerylla |
| 6,115,690 | A | 9/2000 | Wong |
| 6,141,008 | A | 10/2000 | Bloomfield |
| 6,181,383 | B1 | 1/2001 | Fox et al. |
| 6,181,838 | B1 | 1/2001 | Knowlton |
| 6,195,452 | B1 | 2/2001 | Royer |
| 6,202,060 | B1 | 3/2001 | Tran |
| 6,243,721 | B1 | 6/2001 | Duane et al. |
| 6,356,279 | B1 | 3/2002 | Halstead, Jr. et al. |
| 6,363,632 | B1 | 4/2002 | Stentz et al. |
| 6,380,940 | B1 | 4/2002 | Halstead, Jr. et al. |
| 6,392,673 | B1 | 5/2002 | Andrew et al. |
| 6,396,500 | B1 | 5/2002 | Qureshi et al. |
| 6,430,539 | B1 * | 8/2002 | Lazarus et al. ............ 705/10 |
| 6,434,568 | B1 | 8/2002 | Bowman-Amuah |
| 6,456,305 | B1 | 9/2002 | Qureshi et al. |
| 6,473,093 | B1 | 10/2002 | Halstead, Jr. et al. |
| 6,502,102 | B1 | 12/2002 | Haswell et al. |
| 6,504,544 | B1 | 1/2003 | Hollingsworth et al. |
| 7,085,927 | B1 | 8/2006 | Kohli |
| 7,403,916 | B1 | 7/2008 | Brownell et al. |
| 7,440,915 | B1 | 10/2008 | Ulrich |
| 2001/0032182 | A1 | 10/2001 | Kumar et al. |
| 2001/0032183 | A1 | 10/2001 | Landry |
| 2002/0007330 | A1 | 1/2002 | Kumar et al. ............ 705/36 |
| 2003/0172030 | A1 | 9/2003 | Volgunin |
| 2004/0019560 | A1 | 1/2004 | Evans et al. |
| 2004/0044556 | A1 | 3/2004 | Brady et al. |
| 2004/0181749 | A1 | 9/2004 | Chellapilla et al. |
| 2005/0273452 | A1 | 12/2005 | Molloy et al. ............ 707/1 |
| 2006/0218086 | A1 | 9/2006 | Campbell et al. |
| 2006/0218088 | A1 | 9/2006 | Flora et al. ............ 705/39 |
| 2006/0224558 | A1 | 10/2006 | Flora et al. ............ 707/1 |

OTHER PUBLICATIONS

Oktem, B., "Intuit Launches QuickBooks 2006," CDN, www.ITBusiness.ca, pp. 16, Nov. 18, 2005.

Morochove, R., "QuickBooks 2006 Boosts Power Features", PC World, Feb. 2006, 2 pages, vol. 52, No. 1, The Gale Group.

Giovetti, "Managing Your Money for Windows Version 2", *Accounting Technology*, Apr./May, 1995, pp. 1-10 [online], vol. 11, Issue 4, Boston, Enclosed in 11331507.

"Syntax-Assist Panel for Command Based Computer Systems", *IBM Technical Disclosure Bulletin NN890452*, Apr. 1, 1989, p. 52, vol. 31, Issue 11, Enclosed in 11331507.

Heather Campbell et al., U.S. Appl. No. 11/148,959, filed Jun. 8, 2005, entitled "Payee Aliasing".

Jeffrey P. Zimmerman, U.S. Appl. No. 11/331,507, filed Jan. 13, 2006, entitled "Automated Aggregation and Comparison of Individual Spending Relative to Population of Similar Users".

Matthew James Homier et al., U.S. Appl. No. 11/378,766, filed Mar. 17, 2006, entitled "Categorization Usage Snapshot".

John Reed Flora et al., U.S. Appl. No. 11/388,414, filed Mar. 24, 2006, entitled "Associating Multiple Categories With Single Payee or Payor in Financial Software Application".

John Reed Flora et al., U.S. Appl. No. 11/389,342, filed Mar. 24, 2006, entitled "Intelligent Auto-Fill of Transaction Data".

Hassanein, "Image data mining of check transactions: Techniques and applications" *Journal of Information Technology Cases and Applications*, 2002, vol. 4, Issue 4, p. 4, 18 pages.

Quicken 98 User's Guide, Intuit Inc. 1998, pp. 29-34.

* cited by examiner

AUTOMATED AGGREGATION AND COMPARISON OF BUSINESS SPENDING RELATIVE TO SIMILAR BUSINESSES

CROSS-REFERENCE TO RELATED PATENT APPLICATIONS

This application is a continuation-in-part of U.S. patent application Ser. No. 11/331,507, entitled "Automated Aggregation and Comparison of Individual Spending Relative to Population of Similar Users," by Jeffrey P. Zimmerman, filed on Jan. 13, 2006 now abandoned, which is hereby incorporated by reference in its entirety.

The present invention is related to U.S. Utility patent application Ser. No. 11/388,414, for "Associating Multiple Categories with Single Payee or Payor in Financial Software Application," filed Mar. 24, 2006, the disclosure of which is incorporated herein by reference.

BACKGROUND

The present invention relates generally to systems and methods for comparing financial information of a business entity with that of others. A financial manager of a business entity may be able to learn about the general business spending of the entity, but may find it difficult to determine whether the entity is over-spending relative to other entities. Thus, it is desirable to be able to compare the spending transactions of a business entity with those of similar entities by category, by time period, and by other attributes such as payee.

One approach to allow a business entity to compare their spending transactions with those of others is to provide it with average business spending data gathered by market researchers. This approach is inadequate because many factors affect business spending, such as location of the business, type of business, demographic or geographic segments of the target customers, to name only a few. Comparing the spending of a business with average business spending makes little sense in helping the business to spot over-spending. This approach is also inadequate because businesses cannot compare their spending by category with average business spending, as the average business spending data do not provide categorized spending data. Also, market researchers tend to value such business spending information highly, and small businesses usually do not have financial resources to pay for such data.

Another approach is to provide business entities with access to a central database storing spending transactions of many business entities. This raises concerns over privacy and proprietary information. Because the spending transactions stored do not include category information, businesses cannot compare their spending by attributes such as category. Also, unless a business can limit the comparison to similar businesses, the results may not be helpful.

SUMMARY

In various embodiments, the present invention provides methods and systems for comparing spending transactions of a target business entity by category, payee, or other attributes, with those of other business entities. The spending transactions of the target business entity are first aggregated by at least one attribute, such as category, to generate an aggregated spending amount. The aggregated spending amount is then compared with the aggregated spending amount of the collection of business entities.

In one embodiment, the target business entity can limit business entities it compares with by providing selective criteria. A central server maintains a central categorization mapping database storing a collection of payees and their corresponding categories. When the central server receives spending transactions of the target business entity, it generates categorized spending transactions, aggregates the generated spending transactions by category into aggregated spending amounts, and saves the spending transactions. The central server retrieves and aggregates spending transactions of business entities meeting the selective criteria, and compares by category with the aggregated spending amounts of the target business entity. The central server then saves the comparison result, or makes the result available to the target business entity in the form of a report.

In another embodiment, spending transactions are aggregated locally in a client computer of the business entities by generating aggregated spending amounts based on categorization mapping data downloaded from a central server. The aggregated spending amounts are then uploaded to the central server. The central server compares the received aggregated spending amounts with aggregated spending amount of business entities meeting selective criteria. The central server then saves the comparison result, or makes the result available to the target business entity in the form of a report.

One skilled in the art will readily recognize from the following discussion that alternative embodiments of the structures and methods illustrated herein may be employed without departing from the principles of the invention described herein.

DETAILED DESCRIPTION OF THE EMBODIMENTS

The present invention is now described more fully with reference to the accompanying Figures. The present invention may be embodied in many different forms and should not be construed as limited to the embodiments set forth herein. Rather these embodiments are provided so that this disclosure will be complete and will fully convey principles of the invention to those of skilled in the art.

Embodiments of the present invention can be implemented in either a personal financial software package or an accounting software package. It can be implemented as a feature of a software package, or as a feature of a web-based application or website, or as a plug-in that can be installed and used in connection with an existing software application.

System Architecture

Figure 1:
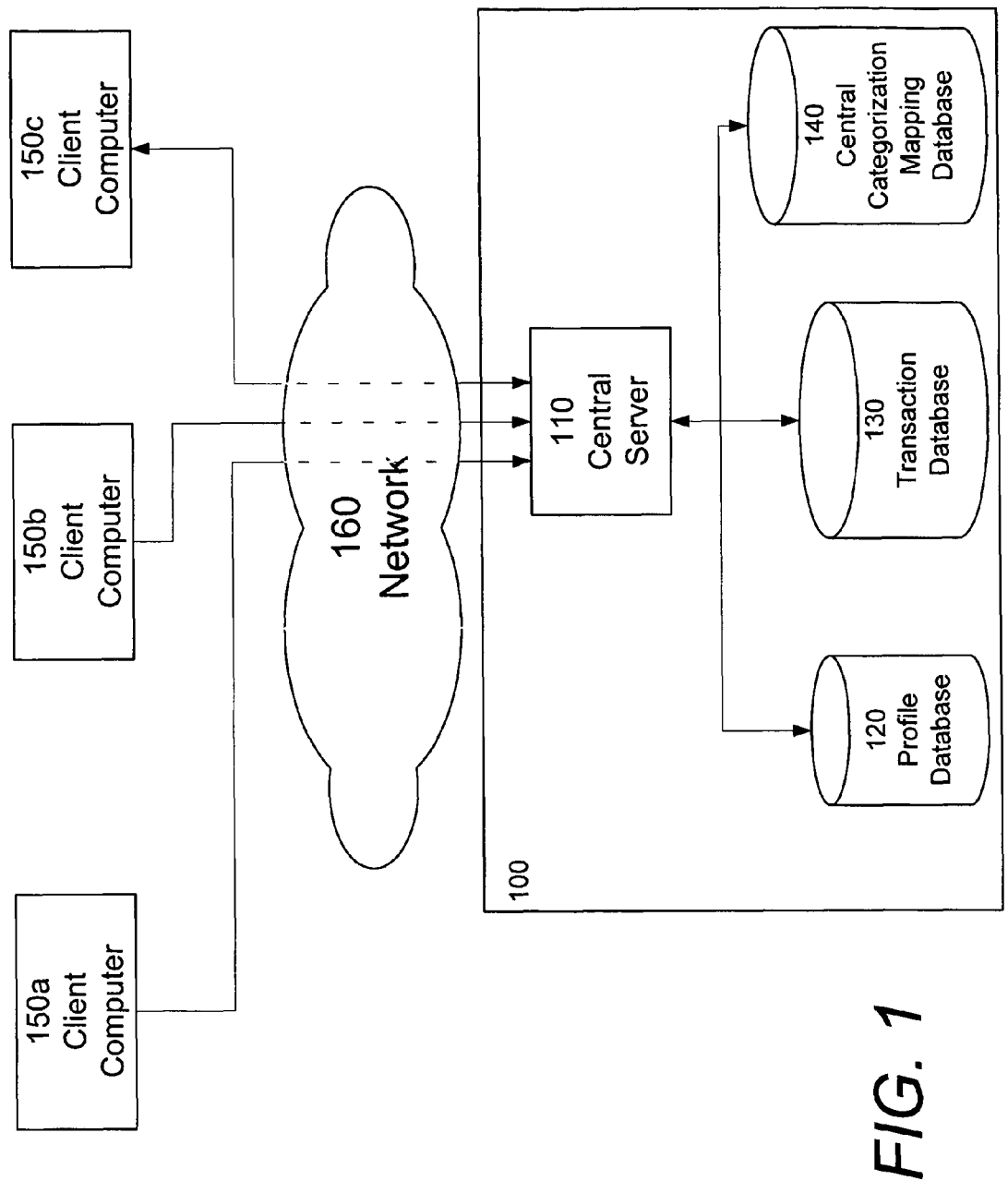
FIG. 1 is a block diagram depicting an architecture for a system for comparing spending transactions of a business entity with those of others according to one embodiment.

Referring to FIG. 1, there is shown a block diagram illustrating the architecture of one embodiment of a system 100 for comparing spending transactions of a business entity with those of a collection of business entities. The system 100 includes a central server 110, a profile database 120, a transaction database 130, and a central categorization mapping database 140.

The central server 110 is connected to the profile database 120, the transaction database 130, and the central categorization mapping database 140. The central server 110 and the databases 120-140 can be in a single computer, or in separate computers communicating with each other through a network. The databases 120-140 may be a relational database or any other type of database that stores data used by the central server 110.

The central server 110 receives data from the network 160, and saves the received data to the databases 120-140 based on the content of the data. The central server 110 also processes requests received from the network 160, generates queries based on the requests, submits the queries to the databases 120-140, and retrieves query results. The central server 110 generates reports based on query results and sends the reports to the network 160.

The profile database 120 stores profiles of business entities. In one embodiment, a business entity can submit its profile to the central server 110. When the central server 110 receives the profile, the central server 110 saves the profile in the profile database 120.

The transaction database 130 stores spending transactions of business entities submitted to the central server 110. The central categorization mapping database 140 stores information mapping business entities to business categories. In some embodiments, a business entity can be related to more than one category.

The system 100 is communicatively coupled to the network 160 and client computers 150*a*, 150*b*, and 150*c*, as indicated by dotted lines. The network 160 may be a wired, a wireless network, or a combination thereof. The network 160 may be a public network, a private network, or a combination thereof. Examples of the network 160 include the Internet, an intranet, a cellular network, a local-area network (LAN), a wide-area network (WAN), or a combination thereof.

A client computer 150 can be used by a business entity to transmit information to the central server 110. The client computer 150 has access to information of the business entity. Such information can be stored in the client computer 150, an external storage device, or a computer accessible by the client computer 150. In some embodiments, only authorized personnel within the business entity can access the central server 110 via the client computer 150.

A client computer 150 can be associated with one or more business entities. Alternatively, a business entity can have multiple client computers 150 connected to the central server 110.

In another embodiment, a client computer 150 can be within an enterprise network of the associated business entity (also called a client network). The client network is connected to the network 160 through one or more routers and/or firewalls. There can be multiple computers on the client network functioning as a client computer 150 for the business entity.

The central server 110 and client computers 150 may be of conventional design, including a processor, an addressable memory, and other conventional features such as a display, local memory, input/output ports, and a network interface. In other embodiments one or more of the components of the central server 110 and client computers 150 may be located remotely and accessed via a network.

One skilled in the art will recognize that the system architecture illustrated in FIG. 1 is merely exemplary, and that the invention may be practiced and implemented using many other architectures and environments.

Method

Figure 2:
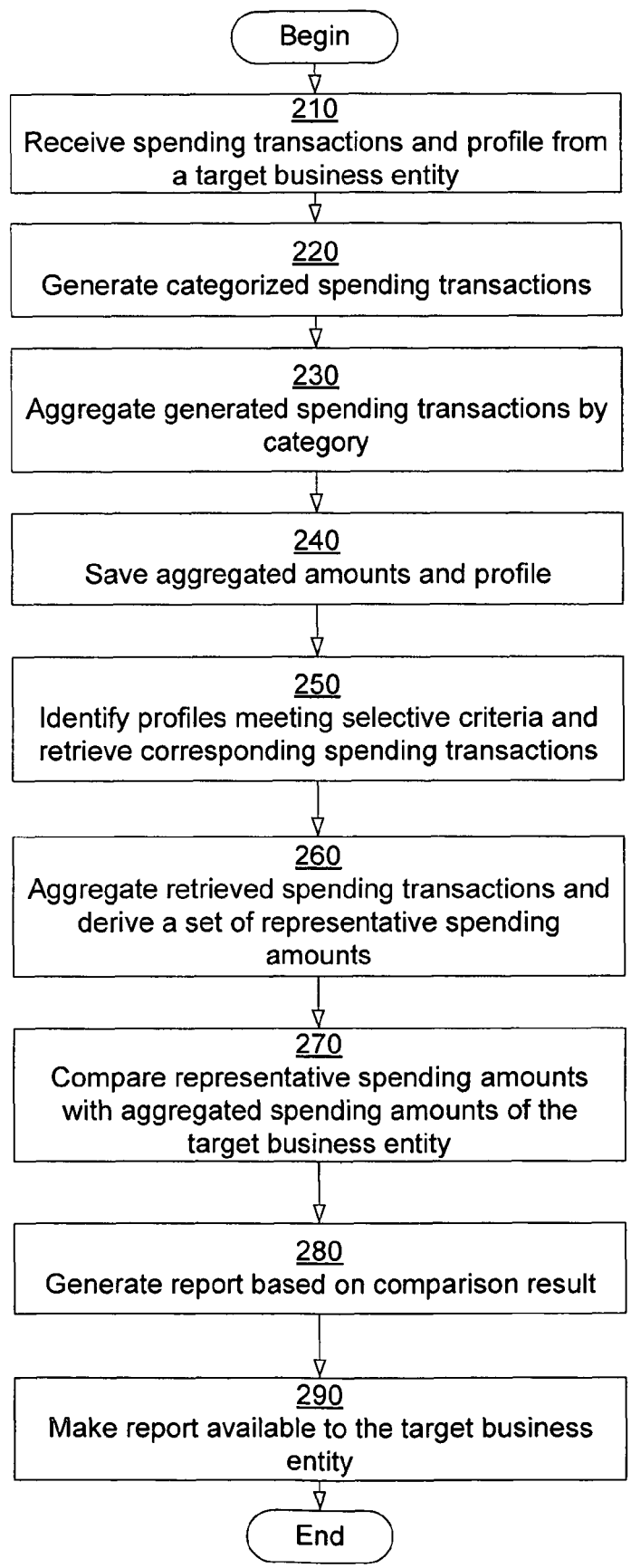
FIG. 2 is a flow diagram depicting a method for comparing spending transactions of a business entity by category with those of others according to one embodiment.

Referring now to FIG. 2, there is shown a flow diagram depicting a method for comparing spending transactions of a target business entity by category with those of other business entities as specified in selective criteria in accordance with one embodiment of the present invention. The steps of the process illustrated in FIG. 2 may be implemented in software, hardware, or a combination of hardware and software. In one embodiment, the steps of FIG. 2 may be performed by one or more components of the architecture shown in FIG. 1, although one skilled in the art will recognize that the method could be performed by systems having different architectures as well.

The central server 110 receives 210 a profile, spending transactions, selective criteria, and aggregative criteria from the target business entity via the client computer 150*a*. The profile and spending transactions are of the target business entity. In one embodiment, in order for the central server 110 to accept profile and spending transactions of a business entity, the business entity needs to subscribe to the central server 110. The subscription may require the business entity to provide its profile information.

In one embodiment, the client computer 150*a* sends such data to the central server 110 when authorized personnel within the business entity requests a report comparing the spending transactions of the business entity with those of subscribed business entities. Alternatively, the client computer 150*a* sends such data automatically and periodically (e.g., monthly) or whenever the client computer 150*a* is connected to the network 160, or in response to some other trigger event(s). The ability to automatically and periodically receive 210 spending transactions allows the central server 110 to maintain up-to-date spending transactions of subscribed business entities. Therefore, a target subscribed business entity can compare its spending transactions with up-to-date spending transactions of a collection of subscribed business entities. It is noted that the collection of subscribed business entities can include the target subscribed business entity.

The profile data can include any type of data, including for example business name, business address, ZIP code, annual profit, size of payroll, number of employees, tax filing status, bank, age of the business, type of the business, and/or targeted customers. Such profile data can be uploaded each time the client computer 150*a* uploads data. Alternatively, in one embodiment, the profile data is only uploaded once, and subsequently uploaded data can include a profile ID in lieu of some or all of the profile data.

The spending transactions include payee information, date of transaction, amount of transaction, and the like. The table below illustrates some exemplary spending transactions of a company named Small Hi-Tech Co.

| Payee | Date | Amount |
| --- | --- | --- |
| AT&T | Mar. 29, 2006 | $230.30 |
| Staples | Mar. 24, 2006 | $356.63 |
| Half Moon Bay Catering | Mar. 31, 2006 | $273.16 |
| Staples | Mar. 21, 2006 | $136.59 |
| PG&E | Mar. 21, 2006 | $542.77 |

As shown above, Small Hi-Tech Co. paid $230.30 to AT&T for phone and Internet services on Mar. 29, 2006. It paid $356.63 and $136.59 to Staples on Mar. 21 and Mar. 24, 2006, respectively, for office supplies. Small Hi-Tech Co. spent $273.16 for food catering service from Half Moon Bay Catering. The target business entity also incurred a monthly cost of $542.77 for utility from Pacific Gas and Electric Company (PG&E).

Alternatively, the spending transactions may already be aggregated by time period, such as month of transaction, before being received 210 by the central server 110, as illustrated by the table below. This approach can alleviate privacy concerns of the target business entity and reduce network traffic.

| Payee | Date | Amount |
|---|---|---|
| AT&T | March, 2006 | $230.30 |
| Half Moon Bay Catering | March, 2006 | $273.16 |
| Staples | March, 2006 | $493.22 |
| PG&E | March, 2006 | $542.77 |

As shown above, the two spending transactions incurred in March, 2006 with Staples are aggregated into one transaction.

The optional selective criteria specify what kind of business entities for the target business entity to compare with. For example, a small Silicon Valley high-tech start-up company might be compared with other high-tech business entities located in the same geographic region and having less than 30 employees. Alternatively, the selective criteria can limit the comparing group to be customers of a specific bank and/or by other criteria.

The optional aggregative criteria specify how the spending transactions should be aggregated. For example, it may be desirable to compare the spending of the target business entity by category with that of the subscribed business entities. Alternatively, it may be more desirable to only aggregate the spending transactions on time and payee. For example, it may be desirable to compare the annual spending of the target business entity on PG&E utility bills with that of the subscribed business entities who are also customers of PG&E.

The optional selective criteria and aggregative criteria can be set by authorized personnel within the target business entity in the request for a report, by the client computer 150*a*, or by the central server 110 based (for example) on selective criteria and/or aggregative criteria previously used to generate a report for the target business entity.

When the aggregative criteria specify the spending transactions to be aggregated by category, the central server 110 generates 220 categorized spending transactions based on the central categorization mapping database 140. The central server 110 queries the central categorization mapping database 140, retrieves categories corresponding to the payees of the spending transactions of the target business entity, and generates 220 categorized spending transactions based on the received spending transactions and the retrieved categories.

When the spending transactions of the target business entity include payees not present in the central categorization mapping database 140, the central server 110 can prompt the user (usually an authorized employee of the target business entity) to provide such information, and add such payee-category information to the central categorization mapping database 140. Alternatively, the central server 110 can check whether a profile of the payee is stored in the profile database 120. If a profile of the payee is located, the central server 110 can determine the category of the payee based on the information in the profile. In some embodiments, a payee can be mapped into more than one category. When the central server 110 processes a spending transaction having a payee associated with multiple categories, the central server 110 can prompt the user to choose a category for the spending transaction. More information about associating a payee with multiple categories can be found in the previously referenced U.S. patent application Ser. No. 11/388,414, titled "Associating Multiple Categories with Single Payee or Payor in Financial Software Application."

The table below illustrates an example of categorized spending transactions for Small Hi-Tech Co. based on the spending transactions illustrated earlier.

| Payee | Category | Date | Amount |
|---|---|---|---|
| AT&T | Service | Mar. 29, 2006 | $230.30 |
| Staples | Office Supply | Mar. 24, 2006 | $356.63 |
| Half Moon Bay Catering | Service | Mar. 31, 2006 | $273.16 |
| Staples | Office Supply | Mar. 21, 2006 | $136.59 |
| PG&E | Utility | Mar. 21, 2006 | $542.77 |

As shown above, the payee AT&T and Half Moon Bay Catering are associated with the Service category, Staples is associated with the Office Supply category, and PG&E is associated with the Utility category.

The central server 110 aggregates 230 the spending transactions of the target business entity according to the aggregative criteria. The aggregative criteria include aggregation by time, by category, or by other attributes, such as payee. The table below illustrates the resultant exemplary data of Small Hi-Tech Co. after aggregating 230 the categorized spending transactions by category.

| Category | Aggregated Spending Amount of March 2006 |
|---|---|
| Utility | $542.77 |
| Office Supply | $493.22 |
| Service | $503.46 |

As shown above, the central server 110 aggregates 230 the spending transactions of Small Hi-Tech Co. with AT&T and Half Moon Bay Catering because both of them are in the Service category. Two transactions with Staples are aggregated in the Office Supply category, and the transaction with PG&E is in the Utility category.

In another embodiment, the aggregation 230 of the spending transactions is performed at the client computer 150*a* before the central server 110 receives 210 the spending transactions. Such aggregation 230 can be by time, by payee, or by other attributes such as category.

When the spending transactions are aggregated 230 by category, the client computer 150*a* stores a local categorization mapping database, generates categorized spending transactions based on the local categorization mapping database, and aggregates the categorized spending transactions by category in a process similar to the one for the central server 110 described above. The client computer 150*a* then uploads the aggregated spending amounts to the central server 110.

The local categorization mapping database can act as a persistent store of categorization mapping data that is periodically synchronized with the central categorization mapping database 140. Alternatively, the local categorization mapping database can be used as a temporary local store of information downloaded from the central server 110 and kept only for a short period of time, such as during a session.

The central server 110 saves 240 the profile received 210 from the client computer 150*a* in the profile database 120, and saves 240 the spending transactions in the transaction database 130. For privacy purposes, the central server 110 can be configured to save only the aggregated spending transactions, unless the target business entity chooses otherwise. This approach can alleviate proprietary information leakage concerns of the target business entity. The central server 110 can also be configured to save the selective criteria and/or aggregative criteria.

The central server 110 identifies 250 profiles in the profile database 120 meeting the selective criteria, and retrieves spending transactions from the transaction database 130 corresponding to the qualified profiles.

For each qualified profile, the central server 110 aggregates 260 the corresponding retrieved spending transactions into aggregated spending amounts based on the aggregative criteria. The central server 110 then derives 260 a set of representative aggregated spending amounts from the aggregated spending amounts corresponding to all qualified profiles. The representative aggregated spending amounts can be, for example, an average (a median, or a sum) of aggregated spending amounts corresponding to all qualified profiles. One skilled in the art will recognize that other forms of aggregation can be used for generating meaningful aggregated data for comparison purposes.

The central server 110 compares 270 the aggregated spending amounts of the target business entity with the representative aggregated spending amounts, generates 280 a report based on the comparison result, and then makes 290 the report available to authorized personnel within the target business entity and/or others.

Alternatively, the central server 110 compares 270 the aggregated spending amounts of the target business entity not only with the representative aggregated spending amounts, but also with the average spending amounts of all subscribed business entities. The table below illustrates an example of a generated report based on such comparison.

| Category | Amount for March 2006 | Average of San Francisco Bay Area high-tech companies with less than 30 employees for March 2006 | General Average for March 2006 |
| --- | --- | --- | --- |
| Utility | $542.77 | $500.76 | $230.93 |
| Office Supply | $493.22 | $600.63 | $327.34 |
| Service | $503.46 | $230.03 | $102.68 |

Alternatively, the central server 110 compares 270 the aggregated spending amounts of the target business entity as percentages of its total spending with those of business entities meeting the selective criteria. The table below illustrates an example of a generated report based on such comparison.

| Payee | % of Total Spending in 2006 | Average of San Francisco Bay Area Staples customers with less than 30 employees for 2006 |
| --- | --- | --- |
| PG&E | 4.25% | 2.16% |
| Staples | 4.16% | 5.63% |

Alternatively, the central server 110 can send comparison results to the client computer 150a, and the client computer 150a generates the report locally. Also, instead of making 290 the report available to authorized personnel within the target business entity, the central server 110 can save the report and/or the comparison result.

When the profile database 120 and the transaction database 130 are initially set up, there may not be enough spending transactions to conduct any meaningful comparisons. Thus, in one embodiment, the central server 110 uses general spending data to compare by category with financial data of the target business entity. Such general average data can include, for example, general spending data for each category.

The above method can also be applied for a business entity to compare its payroll information, tax information, and other financial information such as profit and gross income, with those of other business entities. Such comparisons can help the business entity identify its strengths and weaknesses and improve its performance accordingly.

The present invention has been described in particular detail with respect to one possible embodiment. Those of skill in the art will appreciate that the invention may be practiced in other embodiments. First, the particular naming of the components, capitalization of terms, the attributes, data structures, or any other programming or structural aspect is not mandatory or significant, and the mechanisms that implement the invention or its features may have different names, formats, or protocols. Further, the system may be implemented via a combination of hardware and software, as described, or entirely in hardware elements. Also, the particular division of functionality between the various system components described herein is merely exemplary, and not mandatory; functions performed by a single system component may instead be performed by multiple components, and functions performed by multiple components may instead performed by a single component.

Some portions of above description present the features of the present invention in terms of algorithms and symbolic representations of operations on information. These algorithmic descriptions and representations are the means used by those of skilled in the data processing arts to most effectively convey the substance of their work to others skilled in the art. These operations, while described functionally or logically, are understood to be implemented by computer programs. Furthermore, it has also proven convenient at times, to refer to these arrangements of operations as modules or by functional names, without loss of generality.

Unless specifically stated otherwise as apparent from the above discussion, it is appreciated that throughout the description, discussions utilizing terms such as "determining" or "displaying" or the like, refer to the action and processes of a computer system, or similar electronic computing device, that manipulates and transforms data represented as physical (electronic) quantities within the computer system memories or registers or other such information storage, transmission or display devices.

Certain aspects of the present invention include process steps and instructions described herein in the form of an algorithm. It should be noted that the process steps and instructions of the present invention could be embodied in software, firmware or hardware, and when embodied in software, could be downloaded to reside on and be operated from different platforms used by real time network operating systems.

The present invention also relates to an apparatus for performing the operations herein. This apparatus may be specially constructed for the required purposes, or it may comprise a general-purpose computer selectively activated or reconfigured by a computer program stored on a computer readable medium that can be accessed by the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and operations presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will be apparent to those of skill in the, along with equivalent variations. In addition, the present invention is not described with reference to any particular programming language. It is appreciated that a variety of programming languages may be used to implement the teachings of the present invention as described herein, and any references to specific languages are provided for invention of enablement and best mode of the present invention.

The present invention is well suited to a wide variety of computer network systems over numerous topologies. Within this field, the configuration and management of large networks comprise storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system for comparing spending information of a target entity with spending information of other entities, the system comprising:
   a target entity computing system having stored therein financial transaction data representing spending transactions of the target entity, each spending transaction having a payee, a date, and an amount, the target entity computing system comprising:
   a processor; and
   a memory having stored therein instructions for executing a process for comparing spending information of a target entity with spending information of other entities, the process comprising:
   aggregating, on the target entity computing system, the spending transactions of the target entity with respect to at least one attribute of the spending transactions of the target entity to obtain an aggregated spending amount of the target entity;
   transmitting the aggregated spending amount of the target entity together with the at least one attribute and selective criteria to a central server communicatively coupled to the target entity computing system;
   receiving, at the target entity computing system from the central server, a comparison of the aggregated spending amount of the target entity and aggregated spending amounts of at least one entity of a collection of entities other than the target entity, the entities of the collection meeting the selective criteria, the aggregated spending amounts of the at least one entity of the collection sharing the at least one attribute;
   displaying a report on the target entity computer that comprises the comparison received from the central server.

2. The system of claim 1, the process for comparing spending transactions of a target entity with spending transactions of other entities further comprising saving the spending transactions of the target entity persistently in a database.

3. The system of claim 1, wherein aggregating the spending transactions of the target entity comprises aggregating the spending transactions of the target entity based on time period to obtain the aggregated spending amount of the target entity.

4. The system of claim 1, wherein aggregating the spending transactions of the target entity comprises:
   generating categorized spending transactions based on the spending transactions of the target entity and categorization mapping data on a categorization server coupled to the target entity computing system, the categorization mapping data comprising payees and corresponding categories; and
   aggregating the categorized spending transactions based on category to obtain the aggregated spending amount of the target entity.

5. The system of claim 1, the process for comparing spending transactions of a target entity with spending transactions of a collection of entities further comprising receiving data of the target entity at the central server, the central server being geographically separated from the target entity computing system, the data comprising a profile of the target entity and spending transactions of the target entity.

6. The system of claim 5, wherein receiving the data of the target entity comprises periodically receiving the data of the target entity.

7. The system of claim 6, wherein an identifier is associated with the profile of the target entity, and wherein receiving the data of the target entity comprises receiving the profile of the target entity once and periodically receiving the spending transactions of the target entity and the identifier.

8. The system of claim 5, wherein the selective criteria requires the profile of each entity used in the comparison to match the profile of the target entity.

9. A system for comparing an aggregated spending amount of a target entity with other entity aggregated spending amounts, the system comprising:
   a processor at a central server for executing a process for comparing an aggregated spending amount of a target entity with an other entity aggregated spending amount, the process for comparing an aggregated spending amount of a target entity with an other entity aggregated spending amount comprising:
   receiving from a target entity computing system an aggregated spending amount of the target entity together with selective criteria;
   determining an other entity aggregated spending amount based on the spending transactions of an entity other than the target entity meeting the selective criteria, each spending transaction having a payee, a date, and an amount, each spending transaction sharing a same attribute; and
   generating a comparison of the aggregated spending amount of the target entity and the other entity aggregated spending amount;
   transmitting the comparison to the target entity computing system.

10. The system of claim 9, the process for comparing an aggregated spending amount of a target entity with an other entity aggregated spending amount further comprising receiving data of the target entity at the central server, the central server being geographically separated from the target entity, the data comprising the profile of the target entity.

11. The system of claim 10, wherein receiving the data of the target entity is performed periodically.

12. The system of claim 11, wherein an identifier is associated with the profile of the target entity, and wherein receiving the data comprises receiving the profile of the target entity once and receiving the aggregated spending amount and the identifier periodically.

13. The system of claim 10, wherein the data further comprise at least one aggregative criterion, and wherein determining the other entity aggregated spending amount comprises:
   determining the corresponding collective aggregated spending amount based on the aggregative criterion.

14. The system of claim 13, wherein the selective criterion comprises a qualification of profile of an entity based on the profile of the target entity.

15. The system of claim 9, the process for comparing an aggregated spending amount of a target entity with an other entity aggregated spending amount further comprising saving the aggregated spending amount of the target entity persistently in a database.

16. The system of claim 9, the process for comparing an aggregated spending amount of a target entity with corresponding collective aggregated spending amount further comprising:
   sending central categorization mapping data by a categorization server, or portion thereof to the target entity computing system, the central categorization mapping data comprising payees and corresponding categories, the categorization server being geographically separated from the client computer, the sent central categorization mapping data being used to generate the aggregated spending amount of the target entity.

17. A computer program product for comparing spending information of a target entity with spending information of other entities comprising:
   a tangible computer readable medium;
   and computer program code, encoded on the computer readable medium, comprising computer readable instructions for:
   storing financial transaction data representing spending transactions of a target entity, each spending transaction having a payee, a date, and an amount;
   aggregating, on a target entity computing system, spending transactions of the target entity with respect to at least one attribute of the spending transactions of the target entity to obtain an aggregated spending amount of the target entity;
   transmitting the aggregated spending amount of the target entity together with the at least one attribute and selective criteria to a central server communicatively coupled to the target entity computing system;
   receiving, at the target entity computing system from the central server, a comparison of the aggregated spending amount of the target entity and aggregated spending amounts of entities within a collection of entities other than the target entity, the entities within the collection meeting the selective criteria, the aggregated spending amounts of the entities sharing the at least one attribute; and
   displaying a report on the target entity computer that comprises the comparison received from the central server.

18. A computer program product for comparing spending information of a target entity with spending information of other entities comprising:
   a tangible computer readable medium;
   and computer program code, encoded on the computer readable medium, comprising computer readable instructions for:
   receiving from a target entity computing system an aggregated spending amount of the target entity together with selective criteria;
   determining an entity aggregated spending amount based on the spending transactions of an entity meeting the selective criteria, each spending transaction having a payee, a date, and an amount, each spending transaction sharing a same attribute; and
   generating a comparison of the aggregated spending amount of the target entity and the entity aggregated spending amount;
   transmitting the comparison to the target entity computing system.

* * * * *